United States Patent
Kessler

(10) Patent No.: US 6,409,378 B1
(45) Date of Patent: Jun. 25, 2002

(54) FILLER BODY WITH A CROSS CHANNEL STRUCTURE

(75) Inventor: Alwin Kessler, Tuttwil (CH)

(73) Assignee: Sulzer Chemtech AG, Winterthur (CH)

(*) Notice: Subject to any disclaimer, the term of this patent is extended or adjusted under 35 U.S.C. 154(b) by 0 days.

(21) Appl. No.: 09/490,745

(22) Filed: Jan. 25, 2000

(30) Foreign Application Priority Data

Feb. 12, 1999 (EP) .................................... 99810130

(51) Int. Cl.[7] ................. B01F 3/04; B01F 5/06
(52) U.S. Cl. .............. 366/337; 261/112.2; 261/DIG. 72
(58) Field of Search ................... 366/336, 337, 366/340; 261/94, 112.2, DIG. 72

(56) References Cited

U.S. PATENT DOCUMENTS

| | | | | |
|---|---|---|---|---|
| 3,106,242 A | * | 10/1963 | Jenssen et al. | |
| 3,281,307 A | * | 10/1966 | Moeller et al. | |
| 3,574,103 A | * | 4/1971 | Latkin | |
| 3,652,006 A | * | 3/1972 | Faigle | 261/112.2 |
| 4,337,217 A | * | 6/1982 | Braun | 261/112.2 |
| 4,344,899 A | * | 8/1982 | Monjoie | 261/112.2 |
| 4,497,751 A | * | 2/1985 | Pluss | 261/112.2 |
| 4,666,593 A | * | 5/1987 | Bosne | 261/112.2 |
| 4,670,196 A | | 6/1987 | Hsia | |
| 4,676,934 A | * | 6/1987 | Seah | 261/112.2 |
| 4,710,326 A | * | 12/1987 | Seah | 261/112.2 |
| 5,063,000 A | * | 11/1991 | Mix | 261/112.2 |
| 5,204,027 A | * | 4/1993 | Armstrong et al. | 261/112.2 |
| 5,578,254 A | | 11/1996 | Mix | 261/112.2 |

FOREIGN PATENT DOCUMENTS

| | | | |
|---|---|---|---|
| CA | 1095827 | * | 2/1981 |
| DE | 1501375 | | 1/1970 |
| DE | 26 01 890 | * | 7/1977 |
| DE | 2942481 A1 | | 4/1981 |
| EP | 0129272 A1 | | 12/1984 |
| GB | 1 569 828 | * | 6/1980 |

* cited by examiner

Primary Examiner—Tony G Soohoo
(74) Attorney, Agent, or Firm—Townsend and Townsend and Crew LLP

(57) ABSTRACT

A filler body with a cross channel structure for a packing column or a static mixer apparatus. The filler body is built up of layers that border on one another in which in each case channels are arranged parallel to one another. Lateral channels which are open to one another extend at boundary surfaces between adjacent layers. These lateral channels form a cross-wise arrangement. At least a portion of the layers in each case contain central channels in addition to the lateral channels. A material separation at the boundaries between the central and the lateral channels is produced in about one half of the cases by regularly arranged wall sections. The channel boundaries in the zones of the other half are open.

10 Claims, 5 Drawing Sheets

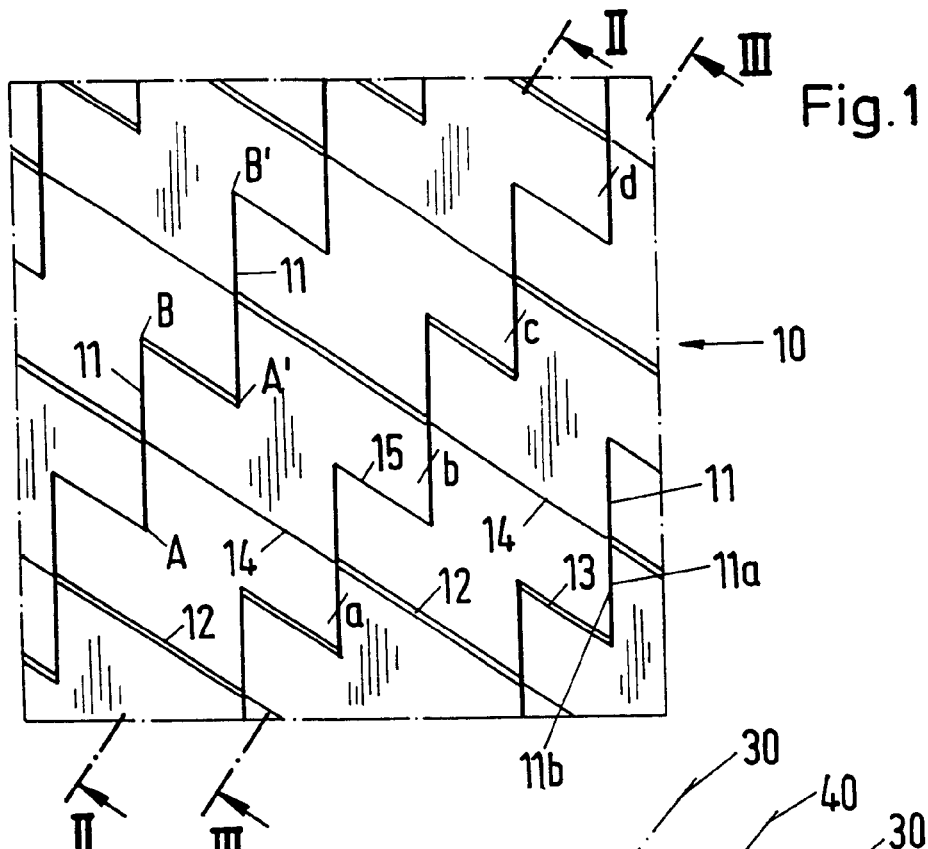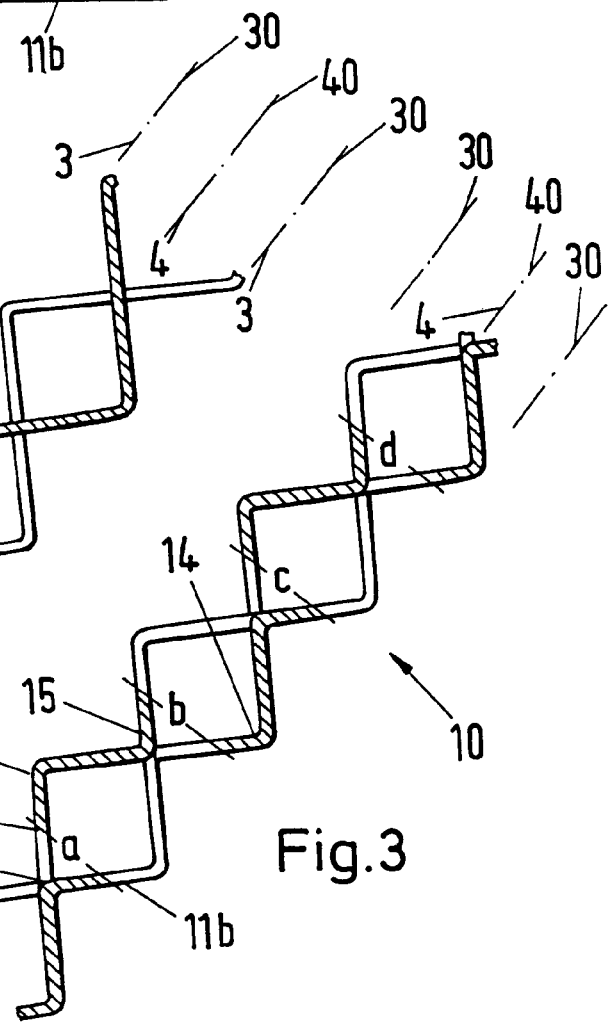

FILLER BODY WITH A CROSS CHANNEL STRUCTURE

BACKGROUND OF THE INVENTION

1. Field of the Invention

The invention relates to a filler body with a cross channel structure for a packing column or a static mixer apparatus, to a column with a filler body of this kind as a packing and to a mixer apparatus with a filler body of this kind as a static mixer structure.

2. Description of the Prior Art

A mixer apparatus for fluids is known from CH-A 547 120 in which the static mixer elements are built into a tube. An installation element of this kind consists of mutually contacting layers which form a cross channel structure with partly open flow channels. A packing body for columns is known from DE-A 26 01 890 which likewise has a cross channel structure. A material and/or heat exchange can be carried out with a column packing of this kind and indeed between a) a medium on surfaces of the packing, in particular a ripple film and/or a catalytically active coating, and b) a gas flow which flows through the channels formed by the packing surfaces.

If the fluid flows through the mutually openly crossing channels, then an interaction between the fluids in which a momentum exchange takes place results at the boundary surfaces between adjacent layers. As a result of this momentum exchange, turbulences arise in the channels in each case in the form of a turbulence braid (translational fluid flow with superimposed rotation), the turbulence nucleus of which extends in the channel direction. These turbulence braids induce further secondary turbulences. The driving forces of the turbulence braids, which are given by the momentum transfer, set in in such a manner that the turbulences remain upheld in the stationary state against the action of frictional forces. The turbulences further a mixing through of the fluid, on the one hand through a material exchange between adjacent channels, and on the other hand through a material exchange between boundary layers and inner spaces of the channels. Since the channels are inclined, the fluid is homogenized with respect to temperature and concentrations over the cross-section of the filler body, this however merely in the direction of the layers. The homogenizing and mixing effects are bought at the price of an energy dissipation which becomes noticeable as an additional flow resistance (or pressure drop).

SUMMARY OF THE INVENTION

The object of the invention is therefore to create a filler body with a cross channel structure for which the desired homogenizing and mixing effects set in at a reduced energy dissipation. The flow resistance in the filler body to be created should be lower in comparison with the conditions in known filler bodies with a cross channel structure, with however the separation performance of a material exchange column or the mixing action of a static mixer respectively largely remaining equally good.

The filler body with a cross channel structure is provided for a packing column or a static mixer apparatus. It is built up of mutually bordering layers in which in each case channels are arranged parallel to one another. At boundary surfaces between adjacent layers there extend lateral channels which are open to one another. These lateral channels form a cross-wise arrangement. At least a portion of the layers contain in each case central channels in addition to the lateral channels. A material separation at the boundaries between the central and the lateral channels is produced in about one-half of the cases with regularly arranged wall sections; in the zones of the other half the channel boundaries are open.

The layers of the filler body in accordance with the invention additionally comprise, besides lateral channels, central channels which are only partly separated from the lateral channels by walls. The lateral channels correspond to the channels of the known cross channel structure in which the parallel channels of the same layer are in each case separated over their entire length by walls. In the lateral channels—as already in the known cross channel structure—primary turbulence braids are driven by the said interaction between adjacent layers. These primary turbulence braids induce secondary turbulence braids in the central channels. Thanks to the central channels a mixing action is achieved in a larger volume with an energy dissipation which is largely equally great. Since the individual layers —in contrast to the known cross channel structure—have a large permeability between the lateral channels of both sides, there results an additional homogenizing, which takes place perpendicular to the direction of the layers.

BRIEF DESCRIPTION OF THE DRAWINGS

FIG. 1 is a plan view of a layer of the filler body in accordance with the invention, FIGS. 2, 3 are two cross-sections through the layer of FIG. 1.

DETAILED DESCRIPTION OF SPECIFIC EXEMPLARY EMBODIMENTS

Figure 4:
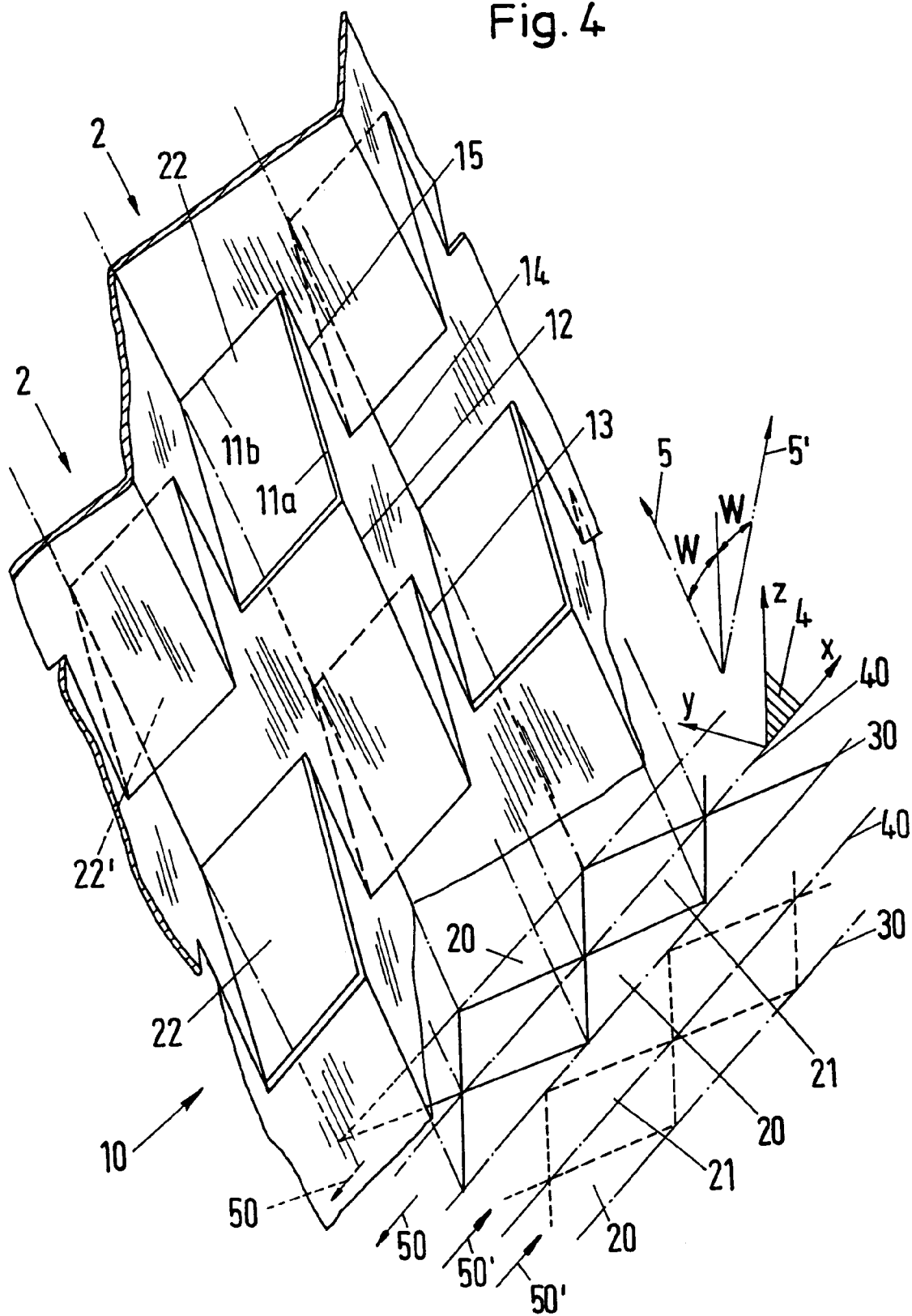
FIG. 4 is an oblique view of the same layer.
Figure 11:
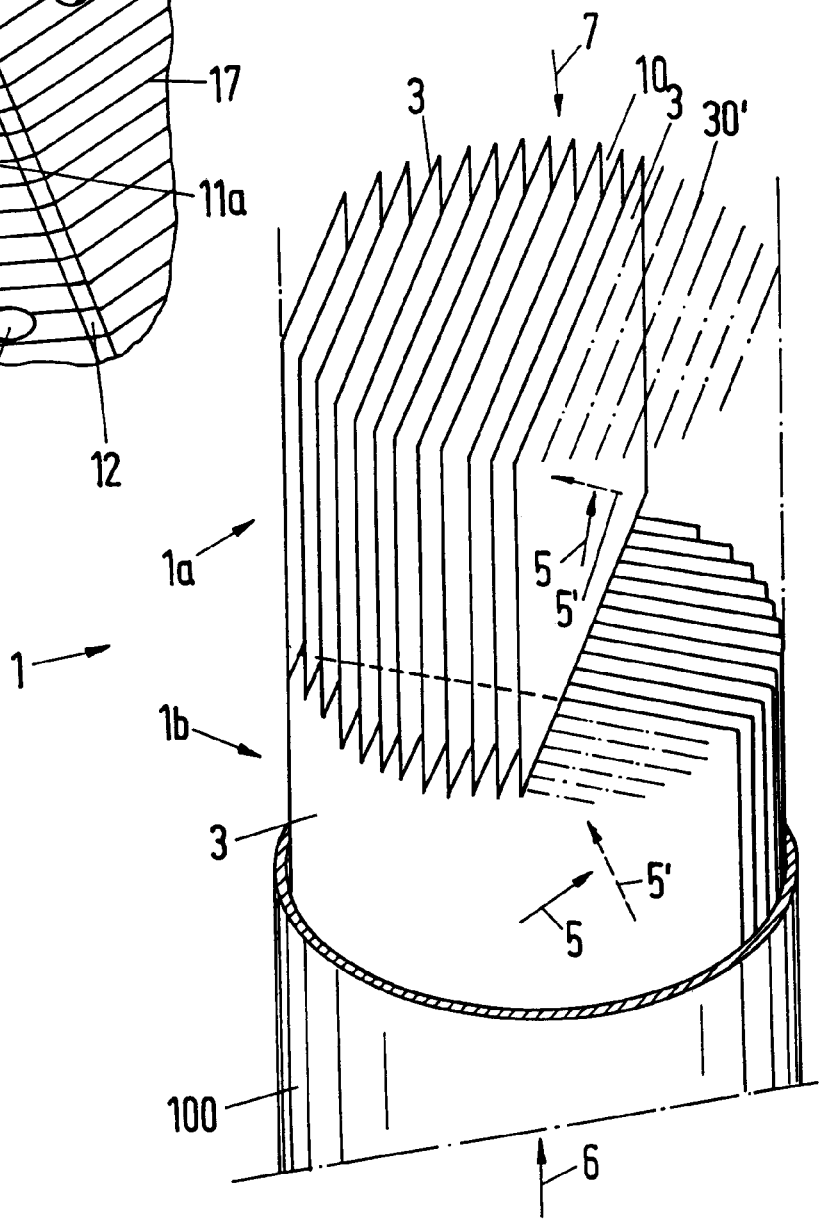
FIG. 11 is a schematic illustration of a column or a static mixer with a filler body in accordance with the invention.

A layer 10 of a filler body 1 in accordance with the invention—see FIGS. 1, 4 and 11—is formed of a sheet metal lamina which is slit in a grid-like manner and deformed. Instead of a sheet metal lamina a film or a wire mesh can also be provided. Slits 11 have slit edges 11a and 11b which span an open surface 22 or 22' (FIG. 4). The slits 11 have end points A, B as well as A', B', which form a grid with triangles ABA' and BA'B'. Metals, ceramic materials and/or plastics can be chosen for the material of the sheet metal lamina (or, respectively, films or meshes).

The filler body 1 is built up of a large number of mutually bordering layers 10 in which channels 2 are arranged in each case parallel to one another. The channels 2 are inclined with respect to a main flow direction. This direction is parallel to the z axis in FIG. 4. Channels 2, namely lateral channels, which are identifiable in FIG. 4 on the basis of cross-sections lying in an x-y plane, extend at boundary surfaces 3 (FIGS. 2, 11) between adjacent layers 10. The lateral channels with in each case a triangular cross-section are designated there with the reference symbol 20. These lateral channels 20 are open to one another; they form a cross-wise arrangement. In addition to the lateral channels 20 the layer 10 contains central channels 21 with in each case a rectangular cross-section. A material separation at the boundaries between the central and the lateral channels 2 is produced in about one-half of the cases by regularly arranged wall sections; in the zones of the other half the channel boundaries are open.

The boundary surfaces of the channels 2 are given by wall sections which are folded in comb shape. Fold edges or combs 12 and 14 of these wall sections are row-wise arranged alternatingly on both sides of a central plane 4 of the layer 10, namely of the x-z plane in FIG. 4; they are parallel to this plane. In the plan view in FIG. 1 the combs 12 and 14 lie forwardly and behind respectively with respect to the plane of the drawing, which extends parallel to the combs 12 and 14. Further fold edges 13 and 15 lie in the central plane 4. The direction 5 of the channels 2 subtends an angle W to the z axis (FIG. 4), and indeed on the left side of the z axis when viewed in the y direction. In the example shown the channel direction 5' of adjacent layers 10 likewise subtends the angle W with the z axis, but on the right side however. This angle of inclination W is greater than 10° and less than 70°. The projections of the channel directions 5 and 5' into the x-y plane are indicated in FIG. 4 as arrows 50 and 50' respectively.

FIGS. 2 and 3 show two parallel cross-sections through the layer 10 which correspond to the lines II—II and III—III in FIG. 1. The positions of the boundary surfaces 3 and the central plane 4 are given by chain-dotted lines 30 and 40. In FIG. 2 only the fold edges 12 and 14 which lie at the boundary surfaces 3 are recognizable, in FIG. 2 also the fold edges 13 and 15 at the central plane 4. The cross-section of FIG. 3 intersects the slits 11 (edges 11*a*, 11*b*) at the locations a, b, c and d.

Figure 5:
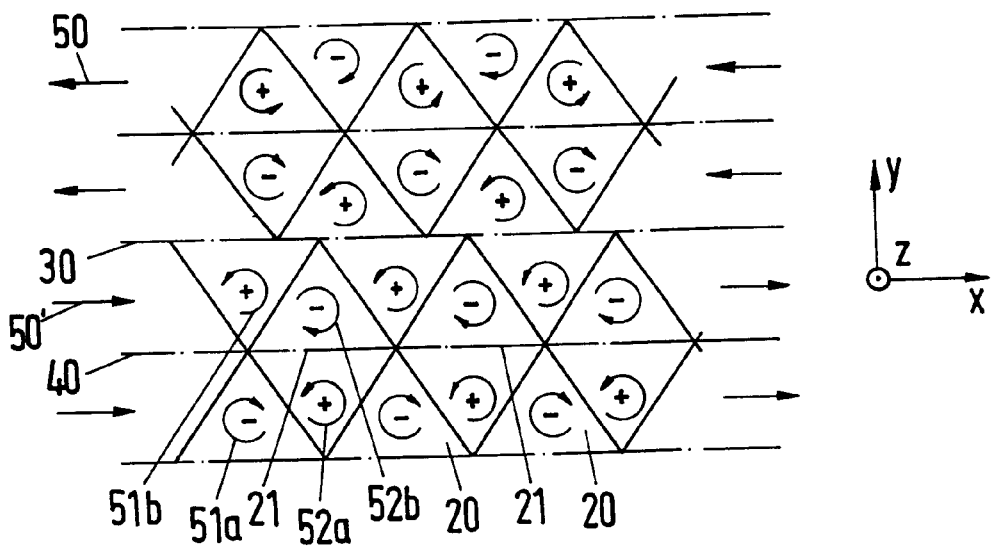
FIG. 5 is a schematic illustration of the flow relationships in the filler body in accordance with the invention.

The flow relationships in the lateral channels 20 and the central channels 21 are illustrated with reference to FIG. 5, which shows the cross-section through two adjacent layers 10 lying in the x-y plane (cf. FIG. 4). Turbulences 51*a* and 51*b* are induced in the lateral channels 20 by the interaction between the flows of adjacent, mutually crossing channels 2. These primary turbulences 51*a* and 51*b* induce secondary turbulence pairs 52*a*, 52*b* in the central channels 21.

Figure 6:
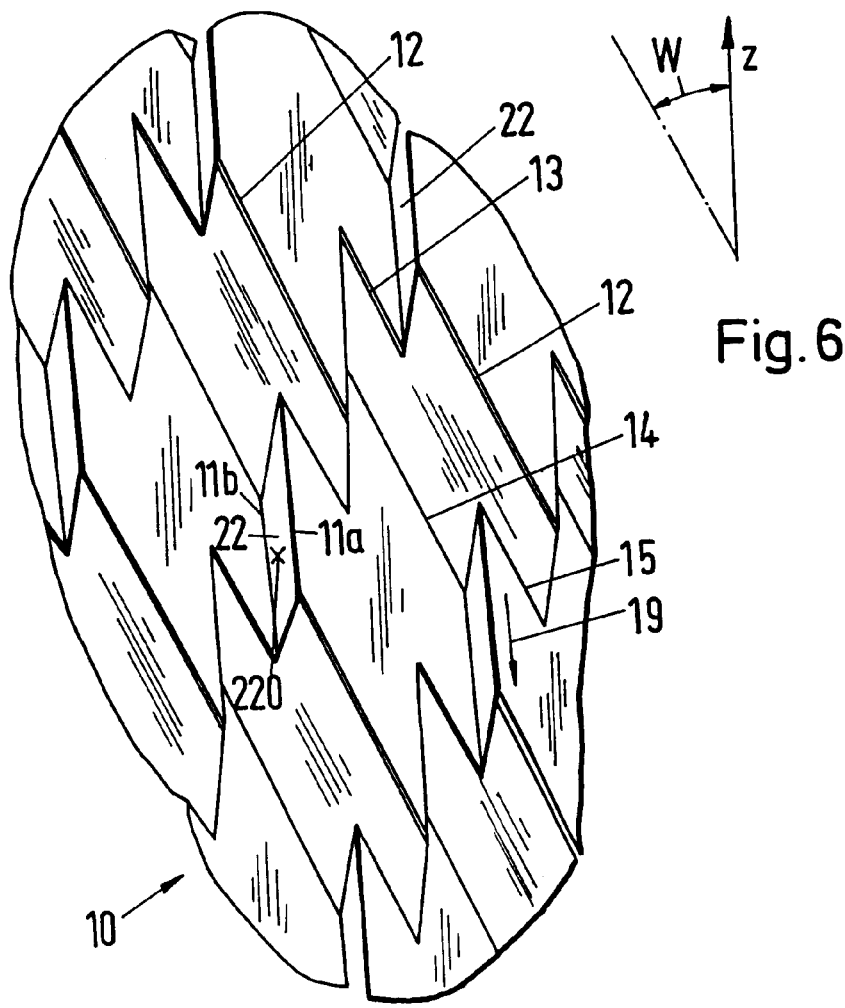
FIG. 6 illustrates a particularly advantageous geometry of the filler body layer.

The regularly arranged wall sections of the channels 2 have free edges, namely the slit edges 11*a* and 11*b*. These edges 11*a* and 11*b* can be curved or toothed (not illustrated). Advantageously however they are rectilinear and lie at least approximately on fall lines, i.e. on lines which lie in a vertical plane (parallel to the z axis) and which are oriented with respect to the surface of the layer 10 in such a manner that they are perpendicular to a horizontal line on this surface. This advantageous embodiment is illustrated in FIG. 6. The direction of the fall line is indicated there by an arrow 19.

Figure 7:
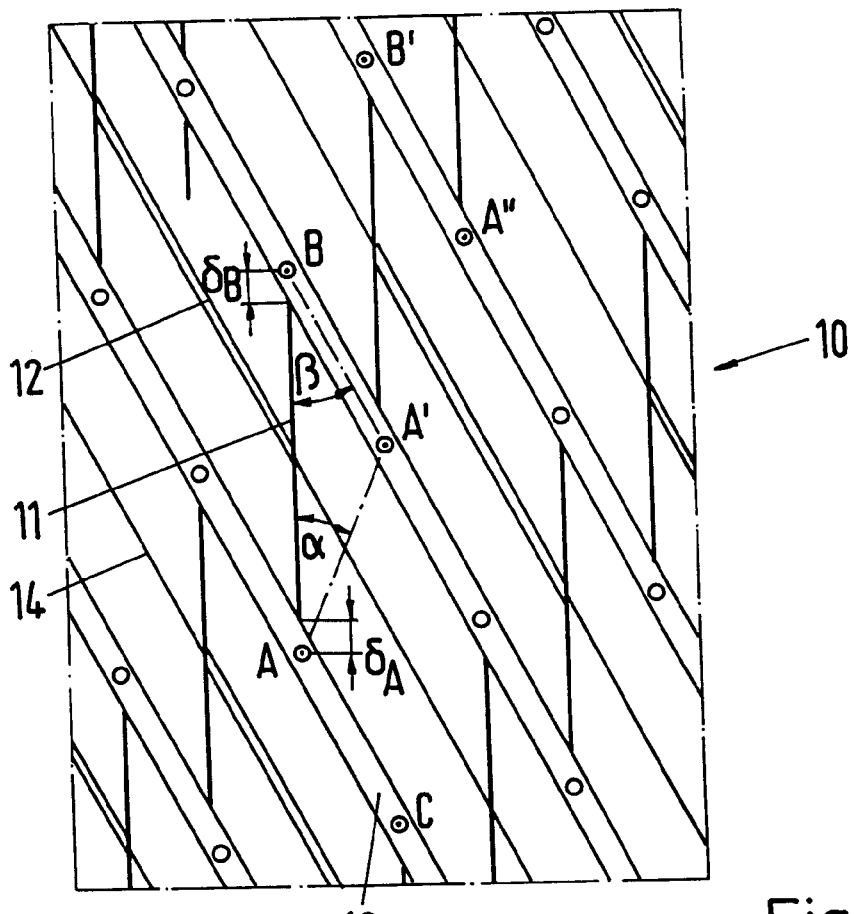
FIGS. 7, 8 illustrate a further embodiment in an illustration corresponding to FIGS. 1 and 2
Figure 8:
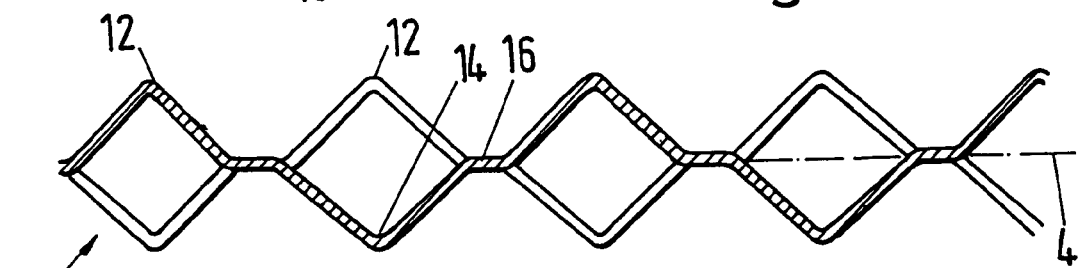
Figure 9:
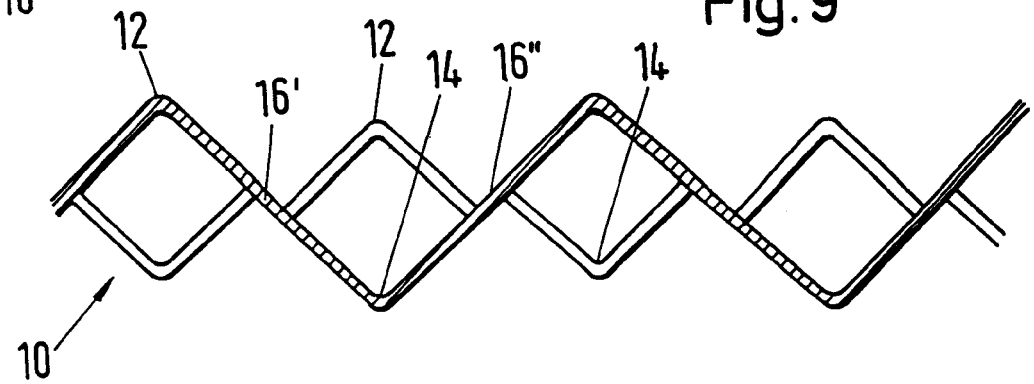
FIG. 9 illustrates a variant of the layer of FIG. 8.

In the embodiment shown in FIG. 7 a triangular grid is present, as in that of FIG. 1. Here however the slits 11 end at distances δA and δB respectively from the corner points A (or A') and B (or B'). As a result of these distances "horizontal" bands 16 through the corner points result—see cross-section in FIG. 8–instead of the fold edges 13 and 15 in FIG. 1. Instead of "horizontal" bands 16 for example inclined bands 16' and 16" can also be provided, as is shown in FIG. 9.

The geometry of a layer 10 can be characterized by the angle of inclination W, the angles of the fold edges 12, 14 and the arrangement of the slits 11. The arrangement of the slits 11 can be defined through the distance between the corner points A and B, the distances δA and δB as well as for example two triangle angles α and β (FIG. 7).

Figure 10:
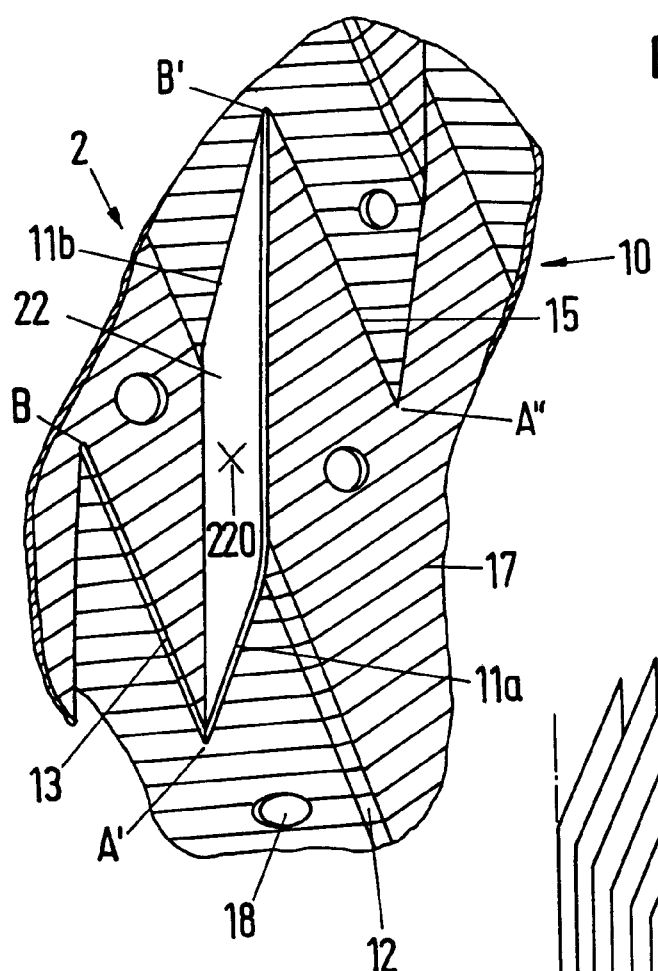
FIG. 10 is a detail illustration of a layer of the type shown in FIG. 6.

Further details which the layer 10 can have in the neighborhood of the open surface 22 in FIG. 6 which is marked by a cross 220 are illustrated in FIG. 10: the material boundaries of the channels 2, the channel walls, are grooved, i.e. are structured with fine grooves. The grooving 17 is transverse to the fall lines (edges 11*a*, 11*b*). The channel walls can also be perforated in addition, for example with round holes 18. Instead of a grooving 17 of numerous parallel grooves a grooving can also be advantageously provided such as is known from EP-A 0 190 435, in which namely a surface structuring is formed by crossing grooves.

The filler body in accordance with the invention need not be built up uniformly of layers of the same kind. Individual layers can also be manufactured of unslit sheet metal lamina (or, respectively, films or meshes) which in each case have a wave form, in particular which are folded in a zigzag shape. In a construction of this kind it is advantageous if the layers of the different kinds are arranged in a regular sequence, thus for example in an alternating arrangement of a) layers with sheet metal lamina of the type illustrated in FIGS. 1 to 10 and b) layers of wave-shaped, unslit sheet metal lamina.

The filler body 1 in accordance with the invention is as a rule built up of a plurality of packing elements which are arranged one above the other, with each element forming a region of the packing with layers of the same orientation and with the horizontal directions of the layers of adjacent elements crossing one another. In FIG. 11 the structural construction of a filler body 1 of this kind is illustrated, namely with boundary surfaces 3 of two packing elements 1*a* and 1*b*, which are arranged in the cylindrical wall 100 of a column or of a static mixer. The chain-dotted lines 30' indicate the upper edges of non-illustrated boundary surfaces 3. The arrows 5 and 5' indicate the channel directions of adjacent layers 10 (not illustrated). The arrows 6 and 7 indicate main flow directions of fluids which are conducted through the filler body 1 for the purpose of a mixing and/or of a material exchange.

The sheet metal lamina (or, respectively, films or meshes) of the layers 10 or also even only individual wall sections of the layers 10 can be further structured through additional slit formations and deformations so that for example smaller wall sections which are folded in comb shape are present which are similar to the wall sections of the channels 2 (cf. FIG. 4) but are designed a good deal smaller than the latter. A cross channel structure with a fine structuring of this kind is known from U.S. Pat. No. 4,710,326.

The channels 2 are illustrated in all exemplary embodiments as rectilinear channels. They can however also have changes in direction, in particular in boundary zones at the upper and/or lower ends of the packing elements 1*a* and 1*b* in FIG. 11. In special embodiments of the packing a lower zone, a middle zone and an upper zone can be distinguished in the packing elements. In the zones at the edges of the packing elements the flow resistance can be reduced with respect to that of the middle zone as a result of a suitable shaping. Advantageous embodiments of this kind are known from WO 97/16247.

The surfaces of the filler body in accordance with the invention can have a coating with catalytically active substances. Filler bodies of this kind can be used in columns for carrying out reactive distillations or as catalyst carriers in exhaust gas catalysts.

What is claimed is:

1. A filler body including a cross channel structure for a packing column or a static mixer apparatus, the filler body comprising layers that border on one another, each layer including first channels that are arranged parallel to one another and lateral channels that are open to one another extending at boundary surfaces between adjacent layers, the lateral channels forming a cross-wise arrangement, wherein at least a portion of the layers contain central channels in addition to the lateral channels, wherein boundaries between the central and the lateral channels are partially formed by wall sections, whereby the wall sections are approximately half as large as the whole surface of the boundaries, and wherein the wall sections have free edges that are rectilinear and lie at least approximately on fall lines, wherein fall lines are defined as lying in a vertical plane and having a direction that is perpendicular to a horizontal line on the surface.

2. A filler body in accordance with claim 1 wherein the layers are formed of a sheet metal lamina that is slit in a grid-like manner and deformed, with the channel boundaries being defined by wall sections that are folded in the manner of a comb, the combs of these wall sections being arranged row-wise alternatingly on both sides of a central plane of the layer and parallel to the central plane.

3. A Filler body in accordance with claim 2 wherein individual wall sections are further structured through additional slit formations and deformations.

4. A filler body in accordance with claim 1 wherein the layers are formed of one of a film or a wire mesh.

5. A filler body in accordance with claim 1 wherein all channels are inclined with respect to a main flow direction, wherein the angles of inclination with respect to the main flow direction are greater than 10° and less than 70°, and wherein mutually crossing channels of adjacent layers are inclined oppositely with respect to the main flow direction and have angles of inclination that are largely equal in magnitude.

6. A filler body in accordance with claim 1 wherein channel walls are at least one of grooved and perforated.

7. A filler body in accordance with claim 1 wherein individual, regularly arranged layers are manufactured of one of unslit sheet metal lamina, or films or meshes that have a wave shape.

8. A column comprising a filler body including a cross channel structure and comprising layers that border on one another, each layer including first channels that are arranged parallel to one another and lateral channels that are open to one another extending at boundary surfaces between adjacent layers, the lateral channels forming a cross-wise arrangement, wherein at least a portion of the layers contain central channels in addition to the lateral channels, wherein boundaries between the central and the lateral channels are partially formed by wall sections, whereby the wall sections are approximately half as large as the whole surface of the boundaries, and wherein the regularly arranged wall sections have free edges that are rectilinear and lie at least approximately on fall lines, wherein fall lines are defined as lying in a vertical plane and having a direction that is perpendicular to a horizontal line on the surface.

9. A column in accordance with claim 8 wherein the filler body is built up of a plurality of packing elements that are arranged one above the other; wherein each element forms a region of the packing with similarly oriented layers, and wherein the horizontal directions of the layers of adjacent elements cross one another.

10. A mixer apparatus comprising a tube and a static mixer structure in the form of a filler body arranged in the tube, the filler body including a cross channel structure and comprising layers that border on one another, each layer including first channels that are arranged parallel to one another and lateral channels that are open to one another extending at boundary surfaces between adjacent layers, the lateral channels forming a cross-wise arrangement, wherein at least a portion of the layers contain central channels in addition to the lateral channels, and wherein boundaries between the central and the lateral channels are partially formed by wall sections, whereby the wall sections are approximately half as large as the whole surface of the boundaries, wherein the regularly arranged wall sections have free edges that are rectilinear and lie at least approximately on fall lines, wherein fall lines are defined as lying in a vertical plane and having a direction that is perpendicular to a horizontal line on the surface.

* * * * *